(12) United States Patent
Tsuzuki

(10) Patent No.: US 9,386,205 B2
(45) Date of Patent: Jul. 5, 2016

(54) OPTICAL APPARATUS

(71) Applicant: CANON KABUSHIKI KAISHA, Tokyo (JP)

(72) Inventor: Masahiko Tsuzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 14/467,658

(22) Filed: Aug. 25, 2014

(65) Prior Publication Data

US 2015/0062409 A1    Mar. 5, 2015

(30) Foreign Application Priority Data

Aug. 27, 2013 (JP) ................. 2013-175106

(51) Int. Cl.
| | |
|---|---|
| H04N 5/225 | (2006.01) |
| H04N 5/232 | (2006.01) |
| G02B 21/36 | (2006.01) |
| G02B 7/10 | (2006.01) |

(52) U.S. Cl.
CPC .............. *H04N 5/2254* (2013.01); *G02B 7/102* (2013.01); *G02B 21/362* (2013.01); *H04N 5/2252* (2013.01); *H04N 5/23212* (2013.01); *H04N 5/23296* (2013.01)

(58) Field of Classification Search
CPC ....................................................... G03B 17/55
See application file for complete search history.

(56) References Cited

U.S. PATENT DOCUMENTS

| | | | | |
|---|---|---|---|---|
| 8,248,524 B2 * | 8/2012 | Chen | .................... | H04N 5/2252 348/374 |
| 8,471,948 B2 * | 6/2013 | Hou | ..................... | H04N 5/2257 348/340 |
| 2004/0169771 A1 * | 9/2004 | Washington | ......... | H04N 5/2253 348/374 |
| 2006/0055787 A1 * | 3/2006 | Hirota | ..................... | G03B 5/00 348/208.5 |
| 2006/0056049 A1 * | 3/2006 | Tokiwa | .................. | G02B 13/16 359/684 |
| 2006/0060328 A1 * | 3/2006 | Ewes | .................... | H01L 23/427 165/80.2 |
| 2006/0256199 A1 | 11/2006 | Takahashi et al. | | |
| 2008/0055420 A1 * | 3/2008 | Orihashi | .............. | H04N 5/2253 348/208.4 |
| 2008/0130135 A1 * | 6/2008 | Shigetoshi | ............. | G02B 7/102 359/701 |
| 2011/0005030 A1 * | 1/2011 | Shirono | ............... | H04N 5/2171 15/363 |
| 2011/0074963 A1 * | 3/2011 | Awazu | ..................... | G03B 5/00 348/208.4 |

FOREIGN PATENT DOCUMENTS

| | | |
|---|---|---|
| JP | 2006-319720 A | 11/2006 |
| JP | 4194221 B2 | 12/2008 |
| JP | 2010-056995 A | 3/2010 |

* cited by examiner

*Primary Examiner* — Jason Flohre
*Assistant Examiner* — Dwight C Tejano
(74) *Attorney, Agent, or Firm* — Rossi, Kimms & McDowell LLP

(57) ABSTRACT

An optical apparatus includes a heat sink radiating the image sensor, a cooling fan unit configured to cool the heat sink, and a first lens barrel including a hollow portion configured to guide light to the image sensor. The first lens barrel holds the cooling fan unit and house the holder unit movably in the hollow portion in an optical axis direction of the image pickup optical system. The holder unit includes a first inlet and a first outlet. The first lens barrel includes a second inlet for taking in external air and a second outlet for exhausting the external air taken in through the second inlet. The first inlet is connected to the second inlet and the first outlet is connected to the second outlet when the holder unit is positioned in the hollow portion of the first lens barrel.

22 Claims, 4 Drawing Sheets

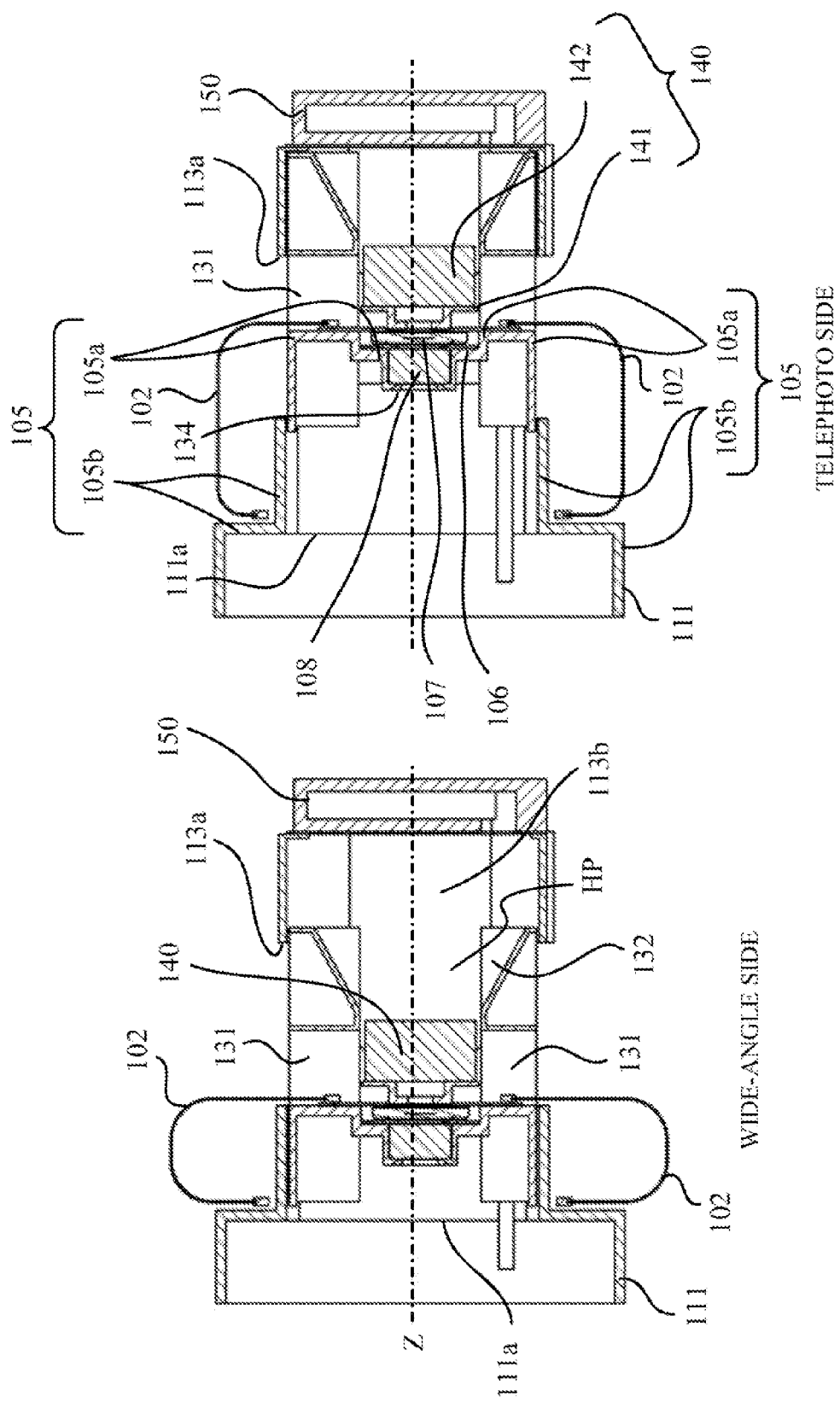
FIG. 3A WIDE-ANGLE SIDE
FIG. 3B TELEPHOTO SIDE

OPTICAL APPARATUS

BACKGROUND OF THE INVENTION

1. Field of the Invention

The present invention relates to an optical apparatus such as an image sensor unit, a lens barrel unit, a lens integrated camera, and a microscope.

2. Description of the Related Art

Recently, optical apparatuses such as a digital video camera and a digital still camera have been increasingly required to be downsized. For example, a so-called inner focus zoom type is smaller than a front focus type because a front lens and an image sensor are fixed while a magnification-varying unit and a focus unit are made movable in an optical axis direction inside a lens barrel. A retractable lens barrel is also smaller because the image sensor is fixed while the magnification-varying unit including the front lens is moved in the optical axis direction. However, a heating value of the image sensor generates tends to increase due to an increasing number of pixels, and a heat radiating measure becomes necessary.

Japanese Patent No. 4194221 discloses a retractable lens barrel configured to move a front lens in varying the magnification. Japanese Patent Laid-open No. 2010-56995 discloses a camera including a Peltier element for heat radiations of an image sensor.

The structure of Japanese Patent No. 4194221, in which a first lens unit optical system has the front lens is made of a large glass and hence is heavy, is disadvantageous for quick zooming and smooth moving-image capturing. In addition, a smaller F-number leads to a larger optical system, and requires a large complicated drive mechanism. It is difficult to mount the structure of Japanese Patent Laid-open No. 2010-56995 in a small camera, because the Peltier element and heat transfer structure are too complicated.

SUMMARY OF THE INVENTION

The present invention provides a small optical apparatus having a high heat radiating performance.

An optical apparatus according to the present invention includes an image sensor configured to photoelectrically convert an optical image of an object formed by an image pickup optical system, a heat sink configured to radiate heat generated by the image sensor, a holder unit configured to hold the image sensor and the heat sink, a cooling fan unit including a cooling fan configured to cool the heat sink, and a first lens barrel including a hollow portion configured to guide light from the image pickup optical system to the image sensor, the first lens barrel holding the cooling fan unit and housing the holder unit movably in the hollow portion in an optical axis direction of the image pickup optical system. The holder unit includes a first inlet for taking external air into the heat sink and a first outlet for exhausting the external air taken in through the first inlet. The first lens barrel includes a second inlet for taking in the external air and a second outlet for exhausting the external air taken in through the second inlet. The first inlet is connected to the second inlet and the first outlet is connected to the second outlet when the holder unit is positioned in the hollow portion of the first lens barrel.

BRIEF DESCRIPTION OF THE DRAWINGS

FIGS. 3A and 3B are sectional views along an optical axis of the image sensor unit illustrated in FIGS. 2A and 2B.

DESCRIPTION OF THE EMBODIMENTS

Figure 1:
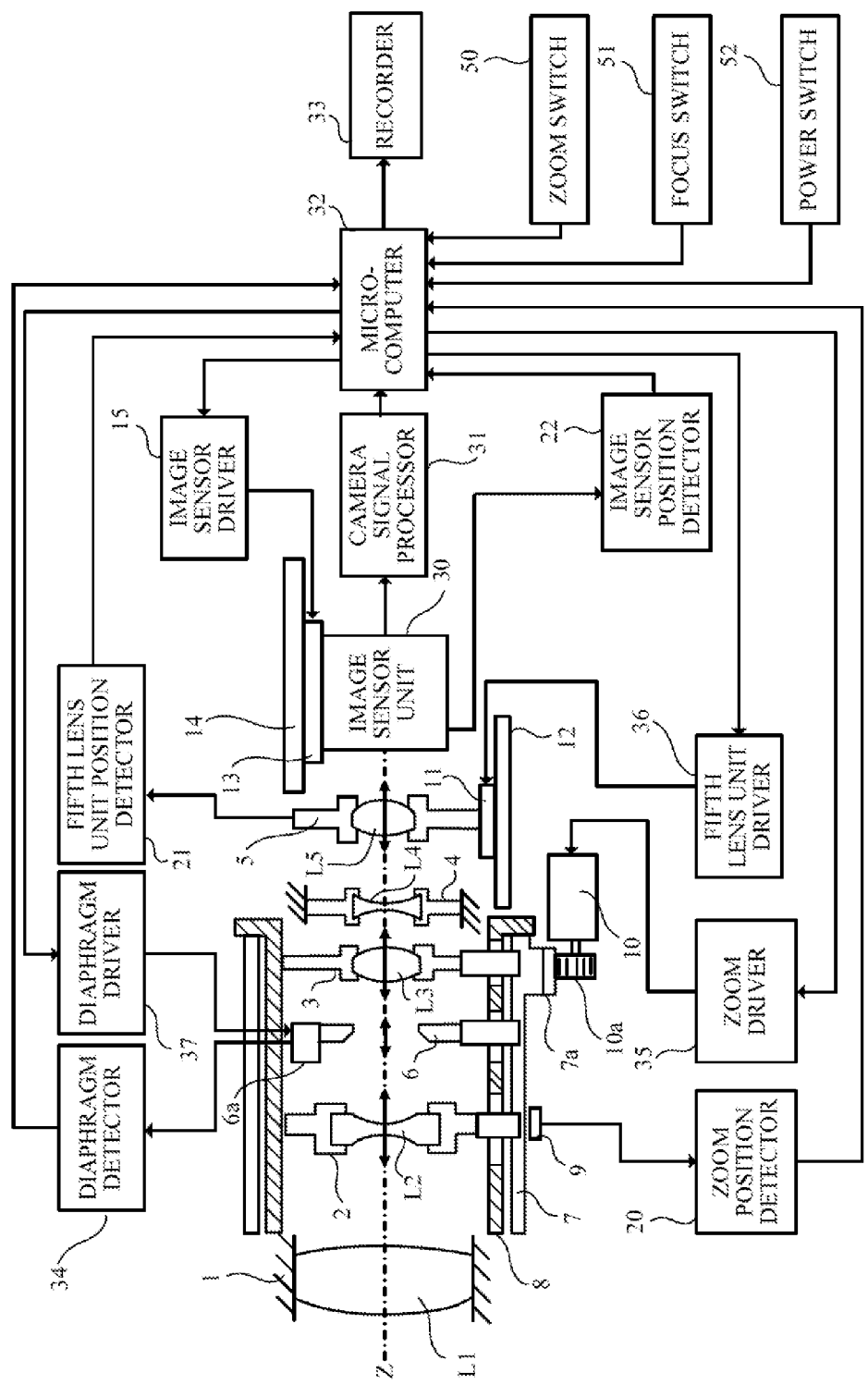
FIG. 1 is a block diagram of an image pickup apparatus (optical apparatus) according to this embodiment of the present invention.

FIG. 1 is a block diagram of an image pickup apparatus (optical apparatus) according to this embodiment of the present invention. The image pickup apparatus is, for example, a lens integrated camera such as a digital video camera or a digital still camera, or a microscope. The left side in FIG. 1 is an object side.

In FIG. 1, reference numeral L1 denotes a fixed first lens unit (fixed unit) closest to the object side. Reference numerals L2 and L3 denote a second lens unit and a third lens unit, respectively, as magnification-varying lens units configured to move in an optical axis direction to vary the magnification. Reference numeral L4 denotes a fixed fourth lens unit, and reference numeral L5 denotes a fifth lens unit (focus lens) configured to move in the optical axis direction for focusing.

The first lens unit L1 to the fifth lens unit L5 constitute an image pickup optical system configured to form an optical image of an object. The image pickup optical system according to this embodiment moves an image pickup plane of an image sensor in the optical axis direction in varying the magnification. In FIG. 1, "z" denotes the optical axis of the image pickup optical system. The image pickup optical system is housed in a lens barrel unit (second lens barrel). A structure of providing focusing by the last lens unit reduces a size of the lens barrel unit.

Reference numeral 1 denotes a fixed lens barrel configured to hold the first lens unit L1. Reference numeral 2 denotes a moving member (lens holding frame) configured to hold the second lens unit L2. Reference numeral 3 denotes a moving member (lens holding frame) configured to hold the third lens unit L3. Reference numeral 4 denotes a fixed member configured to hold the fourth lens unit L4. Reference numeral 5 denotes a moving member (lens holding frame) configured to hold the fifth lens unit L5. The moving member 2, the moving member 3, and the moving member 5 are movably supported in the direction of the optical axis Z of the image pickup optical system.

Reference numeral 6 denotes a diaphragm unit that changes an aperture diameter of the optical system. The diaphragm unit 6 moves aperture blades within a plane orthogonal to the optical axis through a drive unit 6a, thereby changing the aperture diameter. The diaphragm unit 6 adjusts the light quantity entering the image sensor. The aperture diameter is detected by a diaphragm detector 34, and the drive unit 6a is driven by a diaphragm driver 37.

An image sensor unit 30 includes the image sensor 107 and a filter 108, is held by a holder unit 130, and is moved in the optical axis direction of the image pickup optical system in varying the magnification. The image sensor 107 includes a photoelectric conversion element, such as such as a CCD sensor or a CMOS sensor, configured to photoelectrically convert the optical image formed by the image pickup optical system. The filter 108 includes an optical low-pass filter configured to restrict a light component having a spatial frequency of the light passing from the image pickup optical system which is higher than that of the image sensor 107, and an infrared cutting filter configured to cut the infrared light. The image sensor 107 and the filter 108 are illustrated in FIGS. 3A and 3B to be described later.

The image sensor 107 outputs an image signal to a camera signal processor 31. The camera signal processor 31 is mounted onto a substrate 105 to be described later. The camera signal processor 31 amplifies and gamma-corrects the output image signal from the image sensor unit 30. The signal amplified and gamma-corrected by the camera signal processor 31 is output to a microcomputer 32.

The microcomputer 32 is a controller (control circuit) configured to receive multiple signals and provide signal processing thereto and configured to output multiple signals in response to an input signal so as to, for example, control the optical apparatus. The microcomputer 32 includes a processor such as a CPU or a MPU. Reference numeral 33 denotes a recorder configured to record an image signal processed by the microcomputer 32, as well as a recording condition, for example.

The diaphragm detector 34 is configured to detect a rotational position of a driving magnet of the drive unit 6a by a Hall element. In response to an input signal from the camera signal processor 31 and an input signal such as a rotational amount of the diaphragm drive unit 6a from the diaphragm detector 34, the microcomputer 32 outputs a diaphragm drive signal to the diaphragm driver 37 so as to adjust the light quantity.

Reference numeral 50 denotes a zoom switch through which a magnification-varying operation is instructed. Reference numeral 51 denotes a focus switch through which a manual focusing operation (focusing operation) is instructed by a user. Reference numeral 52 denotes a power switch. Reference numeral 7 denotes a cam ring that holds movable a magnification-varying optical system in the optical axis direction. Reference numeral 8 denotes a guide ring including an elongate hole that guides the magnification-varying optical system in a straightforward direction.

When the zoom motor 10 is rotated, the cam ring 7 is rotated about the optical axis at a fixed position due to an engagement between a gear 10a attached to an output shaft of the zoom motor 10 and a gear portion 7a provided to the cam ring 7.

The moving members 2 and 3 and the diaphragm unit 6 have cam followers substantially equally arranged (at circumferentially 120-degree intervals) on their circumferences. The positions of the cam followers are changed in the optical axis direction through a cam groove of the cam ring 7 and the elongate hole of the straightforward moving guide so as to vary the magnification. An arc-shaped encoder 9 is attached to an outer circumference of the cam ring 7 and a zoom position is detected by a zoom position detector 20 attached to a fixed lens barrel.

The moving member (lens holding frame) 5 holds the fifth lens unit L5, has an ultrasonic oscillator 11 driven by a fifth lens unit driver 36. The ultrasonic oscillator 11 constitutes an ultrasonic motor moved and stopped by the friction with a slider 12 in the optical axis direction. The moving member 5 is movably supported in the optical axis direction of the image pickup optical system by a pair of guide bars (not illustrated) extending in parallel to each other in the optical axis direction. The moving member 5 has an encoder (not illustrated) attached thereto so that its position in the optical axis direction is detected by a fifth lens unit position detector 21.

Similarly, the holder unit 130 holds the image sensor unit 30 and has an ultrasonic oscillator 13 that constitutes the ultrasonic motor moved and stopped by the friction with the slider 14 in the optical axis direction through friction. The ultrasonic oscillator 13 is driven by an image sensor driver 15.

An ultrasonic motor is a friction motor that converts vibrations caused by a piezoelectric effect into actions. The ultrasonic motor deforms the ultrasonic oscillator made of a piezoelectric ceramics oscillator by applying the voltage to it, generates a frictional force using its positional change, and converts it into a rotation or in a linear movement.

Specifically, a driver of the image sensor unit 30 moves the holder unit 130 to be described later inside a hollow of the fixed lens barrel 110 with respect to the fixed lens barrel 110 (along the optical axis direction of the image pickup optical system). The driver is not limited to the ultrasonic motor and may use a stepping motor or a VCM, for example. The microcomputer 32 controls the movement (driving) of the image sensor 107 by the image sensor driver 15.

Figures 2A, 2B:
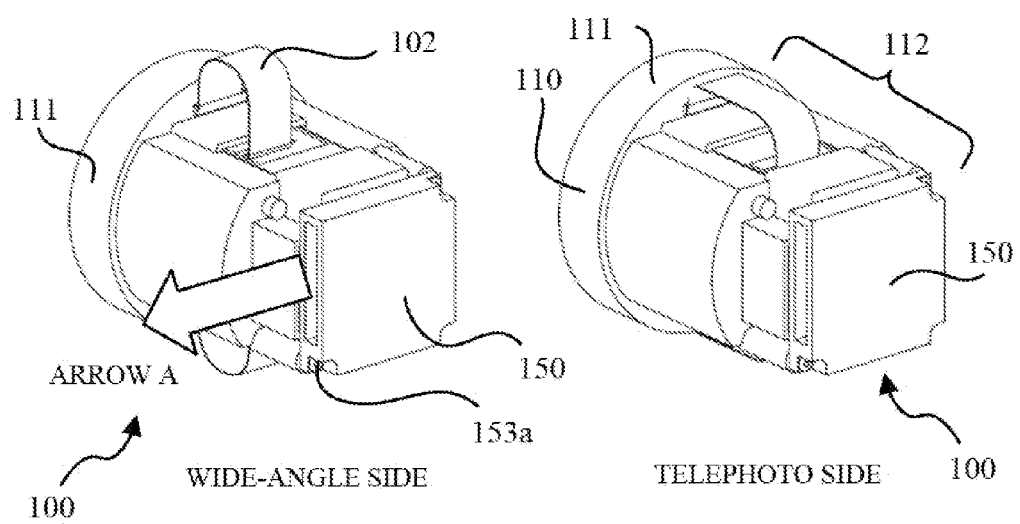
FIGS. 2A and 2B are perspective views of an image sensor unit according to the present embodiment.
Figure 4A:
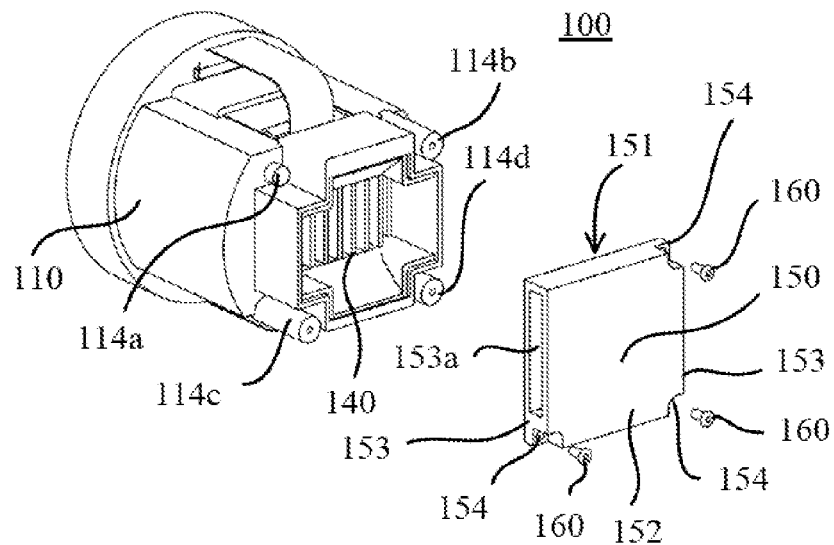
FIGS. 4A and 4B are exploded perspective views of the image pickup apparatus according to this embodiment.
Figure 4B:
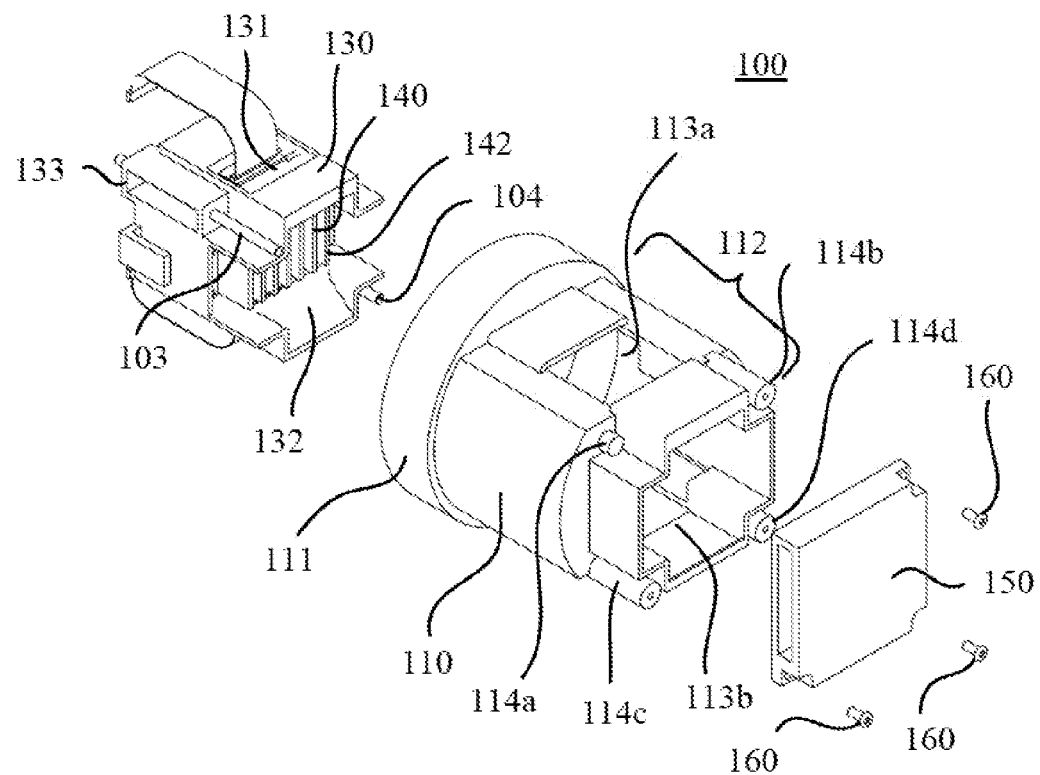

FIGS. 2A and 2B are perspective views of an image sensor unit 100 according to the present embodiment. FIG. 2A illustrates a wide-angle state, and FIG. 2B illustrates a telephoto state. FIGS. 3A and 3B are cross-sectional views along the optical axis z of the image sensor unit 100. FIG. 3A illustrates a wide-angle state, and FIG. 3B illustrates a telephoto state. FIGS. 4A and 4B are perspective views of the image sensor unit 100. FIG. 4A illustrates the image sensor unit 100 from which a cooling fan unit 150 is detached, and FIG. 4B illustrates the image sensor unit 100 from which the holder unit 130 is further detached.

As illustrated in FIG. 4B, the image sensor unit (the optical apparatus) 100 includes the fixed lens barrel 110, the holder unit 130, and the cooling fan unit 150.

The fixed lens barrel 110 of the image sensor unit 100 is fixed to the lens barrel unit (second lens barrel) of the image pickup optical system. The image sensor unit 100 and the lens barrel unit of the image pickup optical system to which the image sensor unit 100 is attached serve as the optical apparatus according to this embodiment.

The holder unit 130 is movably supported in the optical axis direction of the image pickup optical system by a pair of guide bars 103 and 104 extending in parallel to each other in the optical axis direction. The holder unit 130 is provided with an image sensor position detector 22 that is a detector configured to detect the position of the image sensor 107 in the optical axis direction. The image sensor position detector 22 is, for example, an encoder (not illustrated) that includes a light emitting element, a light receiving element, and a scale.

When the power switch 52 of the camera is turned on, the zoom position detector 20 detects the zoom position (magnification-varying position). The moving member 5 and the holder unit 130 are moved in the optical axis direction and stopped at a target position so that by the fifth lens unit position detector 21 and the image sensor position detector 22 can have corresponding values.

The microcomputer 32 controls the fifth lens unit driver 36 based on the image signal from the image sensor 107, oscillates the ultrasonic oscillator 11 through a drive signal, and moves the moving member 5 in the optical axis direction for focusing.

When the zoom switch 50 is operated, the microcomputer 32 determines how a moving direction and a moving speed are operated and performs zooming. The zoom motor 10 receives a drive signal from a zoom driver 35 in response to a control signal from the microcomputer 32 and rotates the cam ring 7 in a direction and an amount that correspond to the operation of the zoom switch 50. At this time, the microcomputer 32 performs a feedback control based on a value of the zoom position detector 20 that detects the position of the cam ring 7.

The ultrasonic motor includes the ultrasonic oscillator 11 and the slider 12, receives a drive signal from the fifth lens unit, driver 36 in response to a control signal from the microcomputer 32, drives the moving member 5 in a direction and an amount that correspond to the operation of the zoom switch 50. At this time, the microcomputer 32 performs a feedback control based on a value of the fifth lens unit position detector 21 that detects the position of the moving member 5.

Similarly, the ultrasonic motor includes the ultrasonic oscillator 13 and the slider 14, receives a drive signal from the image sensor driver 15 in response to a control signal from the microcomputer 32, and drives the image sensor 107 in a direction and an amount that correspond to the operation of the zoom switch 50. At this time, the microcomputer 32 performs a feedback control based on a detection result of the image sensor position detector 22 that detects the position of the image sensor 107.

Although the magnification is varied by moving the image sensor 107 in this embodiment, the present invention is also applicable to focusing by moving the image sensor 107. For example, a focus detection by a contrast detecting method is performed by detecting a contrast peak position of the object image formed by the image sensor 107 while sequentially changing a distance between a focus position of the image pickup optical system and the image sensor 107. In this case, the image sensor 107 is moved in the optical axis direction instead of moving the focus lens in the optical axis direction.

As illustrated in FIGS. 2A and 2B, the fixed lens barrel 110 is a first lens barrel including a fixing portion (first fixing portion) 111 disposed on a front side (the object side) and an attachment portion 112 disposed on a rear side (opposite to the object), to which the holder unit 130 is attached. The fixed lens barrel 110 further includes the hollow portion HP that guides the light from the image pickup optical system to the image sensor 107. The fixed lens barrel 110 houses, in the hollow portion HP, the holder unit 130 movably in the optical axis direction of the image pickup optical system. The holder unit 130 inserted in the hollow portion HP facilitates dust proofing and shields unnecessary light from the image sensor 107. The fixed lens barrel 110 holds the cooling fan unit 150.

The fixing portion 111 has a hollow cylinder shape. The fixing portion 111 is fixedly connected to the lens barrel unit (second lens barrel) of the image pickup optical system on its object side, and the back surface of the fixing portion 111 is fixed to the attachment portion 112. As illustrated in FIGS. 3A and 3B, an opening 111a is formed at the center of the fixing portion 111 and takes in image light. The opening 111a constitutes a hollow portion.

As illustrated in FIG. 4B, the attachment portion 112 has a pair of openings (second inlets) 113a at its top and bottom and an opening (second outlet) 113b at its back end. A vertical direction is parallel to a widthwise direction of the image sensor 107. The pair of openings 113a are connected to a pair of respective openings (first inlets) 131 of the holder unit 130 and disposed outside the openings 131. Each of the openings 113a is an inlet for taking in external air. The pair of openings 113a and the pair of openings 131 may be disposed on the right and left sides of the image sensor unit 100 in a horizontal direction. The horizontal direction is parallel to a lengthwise direction of the image sensor 107.

The opening 113a is rectangular and larger than the opening 131. The opening 131 is connected to the outside through the opening 113a when the image sensor 107 is positioned between a wide-angle position (first position) illustrated in FIG. 3A and a telephoto position (second position) illustrated in FIG. 3B. This configuration allows the opening 131 to take in external air even when the image sensor 107 is moved in the optical axis direction. The first position and the second position are not limited to the wide-angle position and the telephoto position, for example, when the image sensor 107 is used for focusing as described above.

The opening 113b is an outlet of air taken in through the openings 113a and is connected to an opening 132 (first outlet) of the holder unit 130 when the image sensor 107 is positioned between the wide-angle position and the telephoto position. This configuration allows the opening 132 to exhaust the air when the image sensor 107 is positioned between the positions in the optical axis direction. As a result, a cooling efficiency is maintained. The opening 113a has a hollow cross shape and is larger than the opening 132. The opening 113b serves to send air inside the lens barrel 110 taken in through the opening 113a, to the cooling fan unit 150.

The attachment portion 112 includes a holder 114a fixedly holding the guide bar 103 and a holder (second fixing portion) 114d fixedly holding the guide bar 104. The guide bars 103 and 104 constitute a guide unit that moves the holder unit 130 relative to the fixed lens barrel 110 in the optical axis direction of the image pickup optical system in the hollow portion HP of the fixed lens barrel 110. The holder 114d also serves as a screw fixer for fixing a screw 160, and this multi-functionality contributes to downsizing.

The attachment portion 112 further includes screw fixers 114b and 114c to which the screws 160 are fixed. The holders 114a and 114d and the screw fixers 114b and 114c are provided at four corners of the opening 113b at the back end of the attachment portion 112. The cooling fan unit 150 is fixed by the screws 160 to the back end of the attachment portion 112.

The holder unit 130 holds the image sensor 107, the filter 108, and a heat sink 140. The heat sink 140 includes a holding member 141 holding the image sensor 107 and a plurality of cooling fins 142 standing on the holding member 141, and is a heat radiating unit for radiating the heat generated by the image sensor 107. The holding member 141 and the cooling fins 142 are made of metal such as copper having a high thermal conductivity.

The holding member 141 has a recess-shaped section as illustrated in FIGS. 3A and 3B, but may have a flat-plate shaped section. The holding member 141 is thermally connected to the image sensor 107. The heat generated by the image sensor 107 is transferred to the holding member 141 and then transferred to the cooling fins 142. In the present embodiment, each cooling fin 142 has a plate shape extending in the vertical direction, but may have a plate shape extending in the horizontal direction, a column shape, or a needle shape. The column-shaped or needle-shaped cooling fins may be arranged in a grid or arranged concentrically around the optical axis.

The holder unit 130 includes the openings 131 and 132, a sleeve 133 connected to the guide bar 103, and a rotation preventive hole (not illustrated). The holder unit 130 is configured to move in the optical axis direction along the guide bars 103 and 104. The microcomputer 32 controls the movement driven by the drive unit.

The holder unit 130 includes the pair of openings 131 at its top and bottom and the opening 132 on its back surface. The pair of openings 131 are provided next to the cooling fins 142 of the heat sink 140 and are the inlets for taking external air into the heat sink 140. Spaces between the cooling fins 142 of the heat sink 140 serve as flow paths of the air taken in through the opening 131. Intake and exhaust of the external air are achieved by a cooling fan of the cooling fan unit 150. These flow paths of the air are connected to the opening 132. The cooling fins 142 are cooled by passing air. The hollow portion HP of the fixed lens barrel 110 constitutes part of the flow paths of the external air cooling the heat sink 140.

When the image sensor 107 is positioned at the wide-angle position illustrated in FIG. 3A, the openings 131 communicate with left sides (left halves) of the respective openings 113a illustrated in FIG. 3A. When the image sensor 107 is positioned at the wide-angle position illustrated in FIG. 3B, the openings 131 communicate with right sides (right halves) of the respective openings 113a illustrated in FIG. 3B. Since the openings 113a do not block the openings 131 when the holder unit 130 is moved in the optical axis direction, the intake area for external air is maintained constant. The openings 113a and 131 are arranged in a direction (the widthwise direction of the image sensor 107) vertical to the optical axis of the image pickup optical system. The air may flow in an opposite direction (the inlets and the outlets may be reversed), and thus the first outlet and the second outlet may be arranged in a direction vertical to the optical axis of the image pickup optical system.

The cooling fan unit 150 includes a rectangular parallelepiped housing in which the cooling fan (an air blower) (not illustrated) is provided. The cooling fan cools the heat sink 140. The cooling fan unit 150 is another heat radiator for radiating the heat generated by the image sensor 107. In this embodiment, as described above, the heat radiating units are disposed closer to the rear side in the optical axis direction than the image sensor 107.

The cooling fan is supplied with power from a power unit (not illustrated) and rotates. A rotational shaft of the cooling fan is disposed, for example, on the optical axis of the image pickup optical system.

The housing of the cooling fan unit 150 includes a front surface 151, a back surface 152, and a pair of side surfaces 153 as illustrated in FIG. 4A. The front surface 151 and the back surface 152 are vertical to the optical axis. The front surface 151 has an opening (not illustrated), whereas the back surface 152 has no opening. The opening of the front surface 151 has no limitation on its shape and serves as an inlet. Each of the side surfaces 153 is provided with a rectangular opening 153a. The opening 153a serves as an outlet. The cooling fan unit 150 according to this embodiment is a centrifugal fan that takes in air from the opening of the front surface 151 and exhausts the air through the opening 153a of each side surface 153 to the outside of the lens barrel 110, and an air flow path has an L shape.

The cooling fan unit 150 may be an axial flow fan in which the openings 153a of the side surfaces 153 are sealed and the back surface 152 is provided with an opening so that air flows from the opening of the front surface 151 to the opening of the back surface 152 in the optical axis direction. Alternatively, the cooling fan may rotate oppositely so that the inlet and the outlet are reversed. The cooling fan unit 150 has screw holes at three corners 154 and is attached to the opening 113b of the attachment portion 112 by the screws 160.

The image sensor 107, the heat sink 140, and the cooling fan unit 150 are arranged in this order from the object side in the optical axis direction. The heat radiating units are disposed closer to the rear side (opposite to the object) than the image sensor 107. The image pickup optical system, the flow paths of external air, and the cooling fan overlap each other in the optical axis direction of the image pickup optical system. This overlap leads to a small projected shape viewed from the front side of the lens barrel of the image pickup optical system, which means that the lens barrel is downsized and therefore the image sensor unit 100 and the image pickup apparatus are downsized.

The external air having passed through the cooling fins 142 that transfers and radiates the heat of the image sensor 107 passes through the opening 132 and the opening 113b of the holder unit 130, and is exhausted by the cooling fan unit 150 in an arrow A direction illustrated in FIG. 2A. The opening 113b does not block the opening 132 when the holder unit 130 is moved in the optical axis direction, and the opening areas of the outlets of the external air passing through the cooling fins 142 are maintained constant. The flow speed of air in the flow paths can be therefore maintained constant even when the holder unit 130 is moved in the optical axis direction, thereby achieving efficient cooling as designed.

In FIGS. 3A and 3B, the holder unit 130 is provided with a housing 134 that houses the filter 108, and a boss (not illustrated) to which the holding member 141 is attached. The housing 134 is disposed closer to the object side in the optical axis direction than the image sensor 107. The filter 108 is fixed onto the housing 134 by an elastic force applied by an elastic member 106. The elastic member 106 is attached to the housing 134 and pushed against the filter 108 by the image sensor 107, covering the periphery of a surface (protective glass surface) (not illustrated) of the image sensor 107 through which surface the light from the image pickup optical system enters, so as to achieve dust proofing inside the protective glass.

The substrate 105 onto which the image sensor 107 is mounted is connected with wires 102 for transmitting a signal photoelectrically converted by the image sensor 107 and a control signal from the microcomputer 32.

Specifically, as illustrated in FIG. 3B, the substrate 105 is provided to the holder unit 130, and includes a first substrate 105a connected to the image sensor 107, a second substrate 105b provided to the fixed lens barrel 110, and the wires 102. The wires 102 serve as flexible, third substrates connecting the first substrate 105a and the second substrate 105b with each other. The first substrate 105a and the second substrate 105b have bent shapes. The second substrate 105b of the substrate 105 may have the microcomputer 32 and the camera signal processor 31.

The wires 102 are flexible printed boards or wires such as small gauge coaxial cables having a high flexibility. The wires 102 are connected to the outside of the lens barrel 110 and have lengths appropriate for a smooth movement of the holder unit 130 in the optical axis direction to vary the magnification, as illustrated in FIGS. 2A and 2B and FIGS. 3A and 3B. The wires 102 are connected to the first substrate 105a through the openings 113a and 131, which means the openings 113a and 131 are used for the wires 102, thereby achieving multi-functionality and hence downsizing.

Since the inlets and the outlets may be reversed as described above, the wires 102 may be connected to the first substrate 105a through the first outlet and the second outlet.

The image sensor 107 has an effective region of 16:9, for example. In this case, a pair of the wires 102 are disposed in the vertical direction of the fixed lens barrel 110 so that the wires 102 protrude above and below the holder unit 130. A second driver (the ultrasonic oscillator 11 and the slider 12) of the moving member 5 and the fifth lens unit position detector (a second detection unit) 21 configured to detect the position of the focus lens are disposed on one of the right and left sides of the lens barrel of the image pickup optical system. A first drive unit (the ultrasonic oscillator 13 and the slider 14) of the holder unit 130, the image sensor position detector (a first detection unit) 22, and the guide bars 103 and 104 are disposed on one of the right and left sides of the lens barrel of the image pickup optical system. Space in the vertical direction (a first direction) and the horizontal direction (a second direction vertical to the first direction) that are vertical to the optical axis of the image pickup optical system is maximized for the miniaturization.

As described above, this embodiment fixes a first lens unit optical system including a front lens while moving the image sensor 107 in the optical axis direction. This configuration achieves a magnification-varying optical system having a small diameter of the front lens and a small total optical length, as achieved by a retractable lens including a moving first lens unit optical system. Furthermore, a moving unit can remain relatively small even for a small F-number.

The image sensor 107 as a heat source is cooled by the flow paths and the cooling fan unit 150 disposed closer to the rear side in the optical axis than the image sensor 107. Thereby a small and efficient optical apparatus can be provided.

This embodiment provides the position detectors for the cam ring 7, the moving member (lens holding frame) 5, and the holder unit 130 with the detection units configured to detect their absolute positions, but detectors configured to detect distances positions from reset positions may be used. The driving unit for driving each moving unit may use a stepping motor, etc. drive-controlled based on the number of pulses from the reset positions.

The present invention provides a small optical apparatus having a high heat radiating performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-175106, filed Aug. 27, 2013, which is hereby incorporated by reference herein in their entirety.

What is claimed is:

1. An optical apparatus comprising:
    an image sensor configured to photoelectrically convert an optical image of an object formed by an image pickup optical system;
    a heat sink configured to radiate heat generated by the image sensor;
    a holder unit configured to hold the image sensor and the heat sink; and
    a first lens barrel including a hollow portion configured to guide light from the image pickup optical system to the image sensor, the first lens barrel housing the holder unit movably in the hollow portion in an optical axis direction of the image pickup optical system,
    wherein the holder unit includes a first inlet for taking external air into the heat sink and a first outlet for exhausting the external air taken in through the first inlet,
    wherein the first lens barrel includes a second inlet for taking in the external air and a second outlet for exhausting the external air taken in through the second inlet, and
    the first inlet is connected to the second inlet and the first outlet is connected to the second outlet when the holder unit is positioned in the hollow portion of the first lens barrel.

2. The optical apparatus according to claim 1, further comprising a cooling fan unit including a cooling fan configured to cool the heat sink, wherein the image sensor, the heat sink, and the cooling fan unit are arranged in this order from an object side along the optical axis of the image pickup optical system.

3. The optical apparatus according to claim 1, wherein the hollow portion of the first lens barrel constitutes part of a flow path of the external air.

4. The optical apparatus according to claim 1, wherein the cooling fan unit is fixed onto the second outlet of the first lens barrel, and
    wherein the first lens barrel further includes a first fixer fixed to a second lens barrel configured to house the image pickup optical system.

5. The optical apparatus according to claim 1 further comprising a guide unit configured to guide the holder unit relative to the first lens barrel in the optical axis direction of the image pickup optical system in the hollow portion of the first lens barrel,
    wherein the guide unit includes a guide bar fixed onto the first lens barrel and configured to guide the holder unit in the optical axis direction of the image pickup optical system.

6. The optical apparatus according to claim 5, wherein the holder unit further includes a sleeve connected to the guide bar.

7. The optical apparatus according to claim 5, wherein the first lens barrel further includes a second fixer configured to fix the guide bar, and the second fixer also serves as a screw fixer configured to fix the cooling fan unit to the first lens barrel by a screw.

8. The optical apparatus according to claim 1 further comprising:
    a first substrate provided to the holder unit and connected to the image sensor;
    a second substrate provided to the first lens barrel; and
    a flexible third substrate configured to connect the first substrate and the second substrate with each other.

9. The optical apparatus according to claim 8, wherein the third substrate is a flexible printed board.

10. The optical apparatus according to claim 8, wherein the third substrate is connected to the first substrate through the first and second inlets or through the first and second outlets.

11. The optical apparatus according to claim 8, wherein the third substrate protrudes above or below the first lens barrel,
    wherein the optical apparatus further includes a first drive unit of the holder unit and a first detector configured to detect a position of the image sensor,
    wherein the first drive unit and the first detector are disposed on one of right and left sides of the first lens barrel, and
    wherein vertical and horizontal directions of the first lens barrel are both vertical to the optical axis direction of the image pickup optical system, and the vertical direction is orthogonal to the horizontal direction.

12. The optical apparatus according to claim 1, wherein the holder unit further includes:
    a filter including an optical low-pass filter and an infrared cutting filter; and
    a housing disposed closer to the object side in the direction of the optical axis of the image pickup optical system than the image sensor and configured to house the filter.

13. The optical apparatus according to claim 12, wherein the holder unit is provided to the housing and pushed against the filter by the image sensor, and further includes an elastic member covering a periphery of a surface of the image sensor through which surface the light from the image pickup optical system enters.

14. The optical apparatus according to claim 1, wherein the first and second inlets or the first and second outlets are arranged in a direction vertical to the optical axis of the image pickup optical system.

15. The optical apparatus according to claim 14, wherein the direction vertical to the optical axis of the image pickup optical system is a widthwise direction of the image sensor.

16. The optical apparatus according to claim 1 further comprising the image pickup optical system.

17. The optical apparatus according to claim 1, wherein a lens unit disposed closest to the object side in the image pickup optical system is fixed.

18. The optical apparatus according to claim 16, wherein an image pickup plane of the image sensor is moved for a magnification variation when the holder unit is moved.

19. The optical apparatus according to claim 16, wherein an image pickup plane of the image sensor is moved for focusing when the holder unit is moved.

20. The optical apparatus according to claim 16, wherein the image pickup optical system, a flow path of the external air, and the cooling fan overlap each other in the optical axis direction of the image pickup optical system.

21. The optical apparatus according to claim 11 further comprising:
   the image pickup optical system further including a fixed lens unit disposed closest to the object side and a focus lens configured to move for focusing in the direction of the optical axis of the image pickup optical system;
   a second drive unit configured to drive the focus lens; and
   a second detector configured to detect a position of the focus lens,
   wherein the second drive unit and the second detector are disposed on one of the right and left sides of the optical apparatus.

22. An optical apparatus comprising:
   an image sensor configured to photoelectrically convert an optical image of an object formed by an image pickup optical system;
   a heat sink configured to radiate heat generated by the image sensor;
   a holder unit configured to hold the image sensor and the heat sink; and
   a first lens barrel including a hollow portion configured to guide light from the image pickup optical system to the image sensor, the first lens barrel housing the holder unit movably in the hollow portion in an optical axis direction of the image pickup optical system,
   wherein the holder unit includes a first inlet for taking external air into the heat sink and a first outlet for exhausting the external air taken in through the first inlet,
   wherein the first lens barrel includes a second inlet for taking in the external air and a second outlet for exhausting the external air taken in through the second inlet, and
   the external air is taken into the heat sink through the first inlet and the second inlet and is exhausted through the first outlet and the second outlet when the holder unit is positioned in the hollow portion of the first lens barrel.

* * * * *